I. D. JOHNSON.

Check Brace for Carriages.

No. 3,067.

Reissued Aug. 4, 1868.

Witnesses
Joe Alexander
Baltus Deberg

Inventor
I D Johnson
by his Atty.
Wm D Baldwin

N. PETERS, Photo-Lithographer, Washington, D. C.

United States Patent Office.

ISAAC D. JOHNSON, M. D., OF KENNETT SQUARE, PENNSYLVANIA.

*Letters Patent No.* 77,196, *dated April* 28, 1868; *reissue No.* 3,067, *dated August* 4, 1868.

IMPROVED CHECK-BRACE FOR CARRIAGES.

The Schedule referred to in these Letters Patent and making part of the same.

TO ALL WHOM IT MAY CONCERN:

Be it known that I, ISAAC D. JOHNSON, M. D., of Kennett Square, in the county of Chester, and State of Pennsylvania, have invented a certain new and useful Improvement in Check-Braces for Carriages; and I do hereby declare that the following is a full, clear, and exact description of the same, reference being had to the accompanying drawing, which makes part of this specification, and in which—

Figure 1:
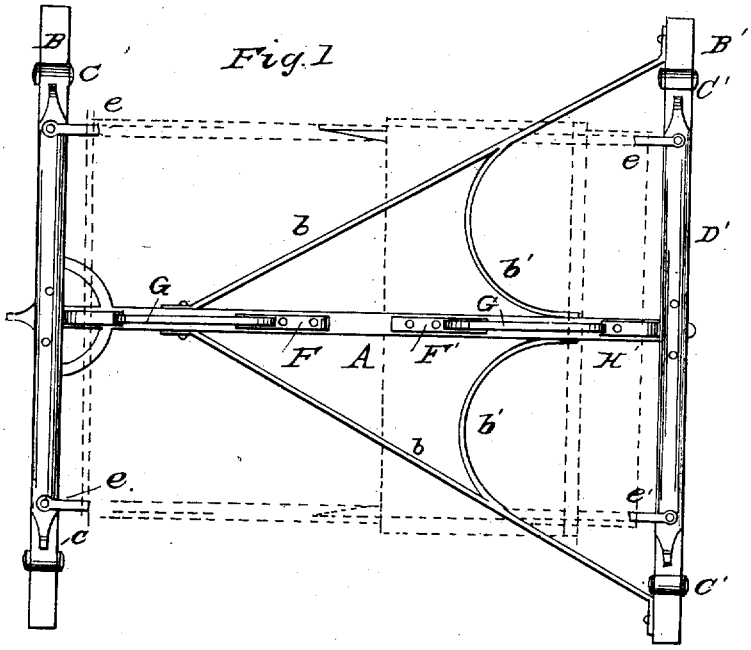

Figure 1 represents a plan or top view of my improved brace, and

Figure 2:
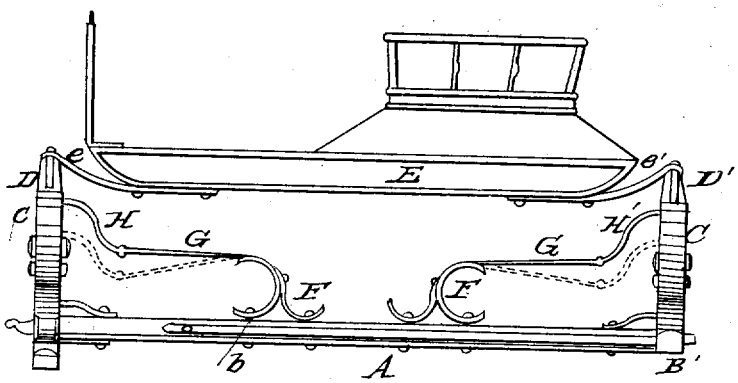

Figure 2 a side elevation of the same, the black lines showing the parts in their normal positions, and the red lines showing the position of the braces when the springs and body are depressed.

It is the object of my invention (which relates to that class of vehicles having elliptic or plate-springs arranged transversely relatively to the body) to prevent undue oscillation of the body of the carriage, as well as to limit and counteract the swaying vibration or torsion of the springs; and to these ends my improvement consists in a novel method of bracing the carriage-springs, by providing each elliptic with a pendent bracket, and connecting this bracket with the bracket on the perch by a plate-spring, whereby the body is braced longitudinally, and the springs are prevented from being depressed unduly, or from rising beyond certain limits, and from swaying back and forth irregularly.

The drawing represents a perch, A, having at each end a bolster, B B′, rigidly connected with it, the hind bolster, B′, being braced to the perch by braces, *b b b′ b′*, in a well-known manner.

The elliptics or springs C C′ are set upon and fastened to the bolsters B B′ respectively, in any of the usual modes, and their upper braces are respectively secured to cross or spring-bars D D′, upon which the body E of the vehicle is supported by means of shackles *e e′* at each corner. I secure brackets, F F′, firmly to the perch, and connect them, by means of plate-springs G G′, with pendent brackets H H′, secured to the upper leaves of the springs C C′. These brackets are in height equal to about half the distance between the upper and lower leaves of the springs in their normal position, so that the check-springs G G′ may be horizontal, or nearly so. The check-springs respectively connect the bracket F with the pendent bracket H, and the bracket F′ with the pendent bracket H′, the connections being made by means of loop-joints which allow the necessary play of the brackets H H′ when depressed.

By this arrangement, the front check-spring, G, prevents the body from forcing the upper leaves of the springs forward, while the rear one, G′, restrains their backward movement. As the springs C C′ are depressed, the upper brackets move around the lower ones in the arc of a vertical circle, which movement tends to draw the springs C C′ towards the brackets F F′, and thus increase their resistance to the pressure, which is then outwards; and the reverse movement of the springs (when they rise) tends to restrain the swaying of the body of the vehicle, or its swinging backwards and forwards, and also prevents it from being thrown above its proper position, thus counteracting the excessive jolting and bouncing, and the attendant danger of breakage, which constitute one great objection to this class of carriage-springs.

I am aware that various modes of checking the oscillations of such springs, and of preventing torsion, have been devised heretofore, and I accordingly do not broadly claim effecting these results. It is obvious, however, that changes may be made in the location of the brackets, or in their connection, without departing from the spirit of my invention; for example, the brackets F F′ might be attached to the spring-bars D D′, or to the bottom of the carriage-body, and the pendent brackets H H′ to the lower leaves of the respective springs; but I prefer the arrangement shown in the drawing.

What I claim as my invention, is—

1. The brackets F F′, located upon the perch, substantially as and for the purpose described.
2. The brackets H H′, secured to the elliptic springs C C′, substantially as and for the purpose described.
3. The combination of the brackets F F′ and the brackets H H′ with the connecting plate-springs G G′, when arranged and operating substantially as and for the purpose described.

4. The combination of the brackets F on the perch, the brackets H on the springs, the plate-springs G, and the elliptic springs, whereby the torsion of the springs and the undue oscillation of the body are prevented.

5. The combination, with the body of the vehicle, of the shackle *e*, the spring C, the brackets F H, and the plate-spring G, whereby the spring is braced from the centre, substantially as described.

6. The combination, with the body of the vehicle, of the shackles, springs, brackets, and connecting plate-springs, substantially as and for the purpose set forth.

In testimony whereof, I have hereunto subscribed my name.

ISAAC D. JOHNSON, M. D.

Witnesses:

HENRY BALDWIN, Jr.,
JOE I. PEYTON.